(12) United States Patent
Nakagawa (10) Patent No.: US 11,763,673 B2
(45) Date of Patent: Sep. 19, 2023

(54) METHODS AND SYSTEMS FOR CONTROLLING OCCUPATION OF GEOGRAPHIC SPACES USING SOFTWARE APPLICATIONS

(71) Applicant: TOYOTA MOTOR ENGINEERING & MANUFACTURING NORTH AMERICA, INC., Plano, TX (US)

(72) Inventor: Masashi Nakagawa, Sunnyvale, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 90 days.

(21) Appl. No.: 17/174,885

(22) Filed: Feb. 12, 2021

(65) Prior Publication Data

US 2022/0262250 A1    Aug. 18, 2022

(51) Int. Cl.
*G08G 1/14* (2006.01)

(52) U.S. Cl.
CPC ............. *G08G 1/146* (2013.01); *G08G 1/141* (2013.01); *G08G 1/148* (2013.01)

(58) Field of Classification Search
CPC ......... G08G 1/146; G08G 1/141; G08G 1/148
See application file for complete search history.

(56) References Cited

U.S. PATENT DOCUMENTS

| | | | |
|---|---|---|---|
| 10,692,374 B2 | 6/2020 | Salvucci et al. | |
| 2007/0040701 A1* | 2/2007 | Browne | G08G 1/143 340/932.2 |
| 2013/0057686 A1 | 3/2013 | Genc et al. | |
| 2013/0066667 A1 | 3/2013 | Gulec et al. | |
| 2013/0073350 A1 | 3/2013 | Blustein | |
| 2014/0089283 A1* | 3/2014 | Klassen | G06F 16/9537 707/706 |
| 2016/0189435 A1 | 6/2016 | Beaurepaire et al. | |
| 2017/0118307 A1 | 4/2017 | Beaurepaire et al. | |
| 2017/0200396 A1* | 7/2017 | Vincent | G09B 21/006 |
| 2017/0267233 A1* | 9/2017 | Minster | B60W 30/06 |
| 2018/0197166 A1* | 7/2018 | Holman | G06Q 30/0282 |
| 2019/0019407 A1 | 1/2019 | Nakhjavani | |
| 2019/0122560 A1* | 4/2019 | Goto | G08G 1/202 |
| 2021/0061226 A1* | 3/2021 | Jeong | A61B 5/4845 |

FOREIGN PATENT DOCUMENTS

| | | |
|---|---|---|
| CN | 111161565 A | 5/2020 |
| CN | 111357035 A | 6/2020 |
| WO | 2016/148560 A1 | 9/2016 |

\* cited by examiner

*Primary Examiner* — Kam Wan Ma
(74) *Attorney, Agent, or Firm* — Dinsmore & Shohl LLP (57) ABSTRACT

Device and methods for controlling occupation of geographic spaces. The method includes identifying, via a software application, an object for performing an action for the vehicle, the action relating to occupying a space for the vehicle, transmitting a targeted request to the object for the performing the action, receiving a notification that the space is occupied by the object in response to the transmitting the targeted request, and determining that the action is completed upon arriving at the space.

13 Claims, 7 Drawing Sheets

METHODS AND SYSTEMS FOR CONTROLLING OCCUPATION OF GEOGRAPHIC SPACES USING SOFTWARE APPLICATIONS

TECHNICAL FIELD

The present disclosure generally relates to controlling occupation of geographic spaces in an environment, and more specifically, to enabling the reservation and occupation of geographic spaces via the use of software applications that connect multiple users and devices with each other.

BACKGROUND

Conventional devices and systems utilize one or more external devices such as motion sensors, proximity sensors, cameras, and the like, to identify the availability of various geographical spaces (e.g., parking spots) for potential occupation by vehicles. Specifically, these devices may be configured to detect when a particular vehicle approaches and exits a parking space, e.g., using one or more motion sensors, thereby determining when a particular parking spot is occupied or vacant. However, conventional devices and systems do not enable users to connect with other users for the purpose of enabling occupation of geographic spaces.

Accordingly, a need exists for a system that enables connections between users to facilitate occupation of geographic spaces.

SUMMARY

In one embodiment, a device operating in conjunction with a software application to facilitate occupation of geographic spaces is provided. The device includes a processor that operates in conjunction with a software application. The processor is configured to identify, via the software application, an object for performing an action for the vehicle, the action relating to occupying a space for the vehicle, transmit a targeted request to the object for performing the action, receive a notification that the space is occupied by the object in response to transmitting the targeted request, and determine that the action is completed upon arriving at the space.

In another embodiment, a method for facilitating occupation of geographic spaces is provided. The method includes identifying, via a software application, an object for performing an action for the vehicle, the action relating to occupying a space for the vehicle, transmitting a targeted request to the object for performing the action, receiving a notification that the space is occupied by the object in response to transmitting the targeted request, and determining that the action is completed upon arriving at the space.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

As stated, conventional devices and systems utilize one or more external devices to determine the availability of parking spaces. Specifically, these devices and systems may detect when a particular vehicle approaches and exits a parking space to determine when a particular parking spot is occupied or vacant, e.g., using one or more motion sensors, proximity sensors, etc. However, conventional devices and systems do not enable users to connect with other users and request users to perform one or more actions with respect to a particular vehicle for the purpose of facilitating occupation of geographic spaces.

The methods and devices described in the present disclosure address and overcome these deficiencies. Specifically, these methods and devices relate to facilitating occupation of geographic spaces by connecting users through a software application accessible via their respective devices, and enabling these users to request other users to perform various tasks via the software application, e.g., reserving a parking spot, transporting a user's vehicle from one location to another, identifying the hours of operation of a store, and so forth. In embodiments, a particular user may access a software application as described in the present disclosure, communicate a targeted request to perform an action (e.g., with respect to the user's vehicle), receive a notification that the action has been performed, and determine that the action has been completed, e.g., upon arriving at a geographic space or location such as a parking spot.

Figure 1:
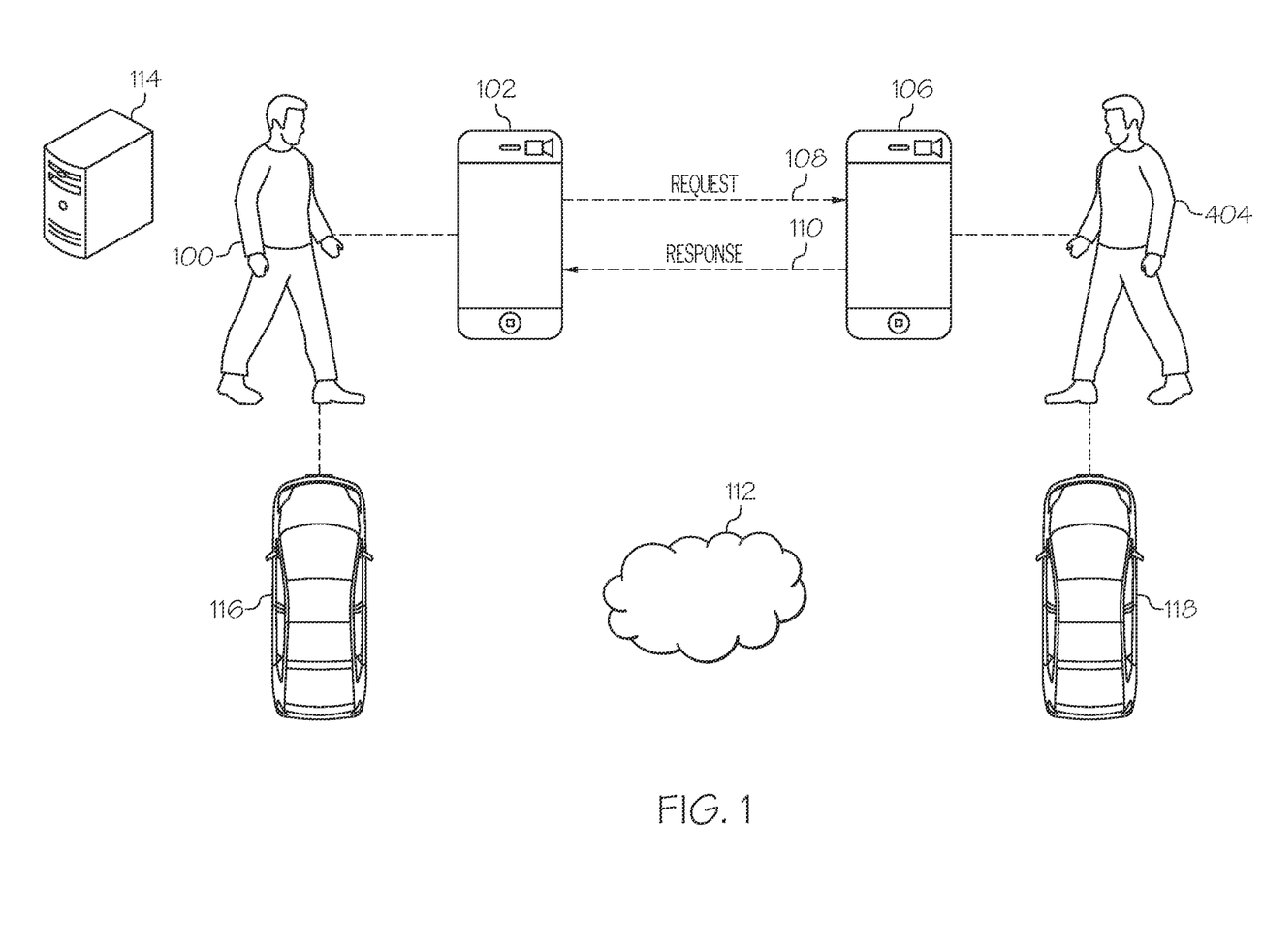
FIG. 1 schematically depicts an example operating environment for facilitating the occupation of geographic spaces, according to one or more embodiments described and illustrated herein.

Referring now to the drawings, FIG. 1 schematically depicts an example operating environment for facilitating the occupation of geographic spaces, according to one or more embodiments described and illustrated herein;

As illustrated, FIG. 1 depicts users 100, 104, each of whom may be associated with respective devices 102, 106. In embodiments, the devices 102, 106 may be smartphones that are configured to communicate various types of data to each other and to the server 114 via the communication network 112. In embodiments, the devices 102, 106 may also be a laptop, a smartphone, a desktop, and so forth. In some embodiments, the users 100, 104 may also be associated with vehicles 116 and 118, e.g., owners of vehicles 116, 118.

In some embodiments, the user 100 may access a software application via the device 102, e.g., by selecting an icon associated with the software application that is output on a display of the device 102. In embodiments, the user 100 may select a particular action to be performed, e.g., reserve a parking spot at a particular location for a particular time frame, transport the vehicle 116, determine the accurate hours of operation of a store, business, and/or the like. Other actions are also contemplated. The user 100 may transmit a message, via the communication network 112, to devices of a plurality of other users that are associated with the software application. This message may include the task that the user 100 would like performed. In embodiments, the message may be a broadcast signal sent to a plurality of users in a geographic area, e.g., in a geographic area near a predetermined proximity of where one or more actions may need to be performed.

Thereafter, the user 100 may identify and select, via the software application, a particular user for performing an action. In embodiments, the user 100 may select the user 104 to perform an action such as, e.g., reserve a parking spot in a parking lot at a particular time. The user 100 may transmit a targeted request 108 to the device 106 of the user 104 for performing the action of reserving the parking spot. In response to the targeted request 108, the user 104 may drive the vehicle 118 to a particular parking spot at a location that is specified by the user 100 in the targeted request 108, and communicate a response 110 via the device 106 to the device 102 of the user 100. The response may appear as a notification that is output on a display of the device 102 in real time. Based on the notification, the software application may, automatically and without user intervention, determine that the action of reserving a parking spot for the vehicle 116 is completed. In embodiments, in return for receiving the notification, the user 100 may process and transmit a payment of a certain amount from the device 102 to the device 106.

Additionally, other types of actions may include requesting a valet located near a venue in which the user 100 has parked the vehicle 116 to transport the vehicle 116 to another location, requesting one or more users to provide information regarding the hours of operation of a store, e.g., which may involve a user traveling to the location of the store, identifying the hours of operation of the store, and communicating the hours of operation from the device 106, via the communication network 112, to the device 102. As stated, various other types of actions are also contemplated. In this way, the system described in the present disclosure may enable one or more users to utilize their respective devices to connect and communicate with the devices of other users in order to perform various actions, e.g., control the occupation of geographic spaces, transport vehicles from one location to another, and/or the like.

It is further noted that, in some embodiments, the software application described above may be accessible via a processor included within a vehicle, e.g., the vehicles 116, 118. The type and operation of the components included within the vehicle 116, 118 and the devices 102, 106 will be described in detail in FIG. 2.

Figure 2:
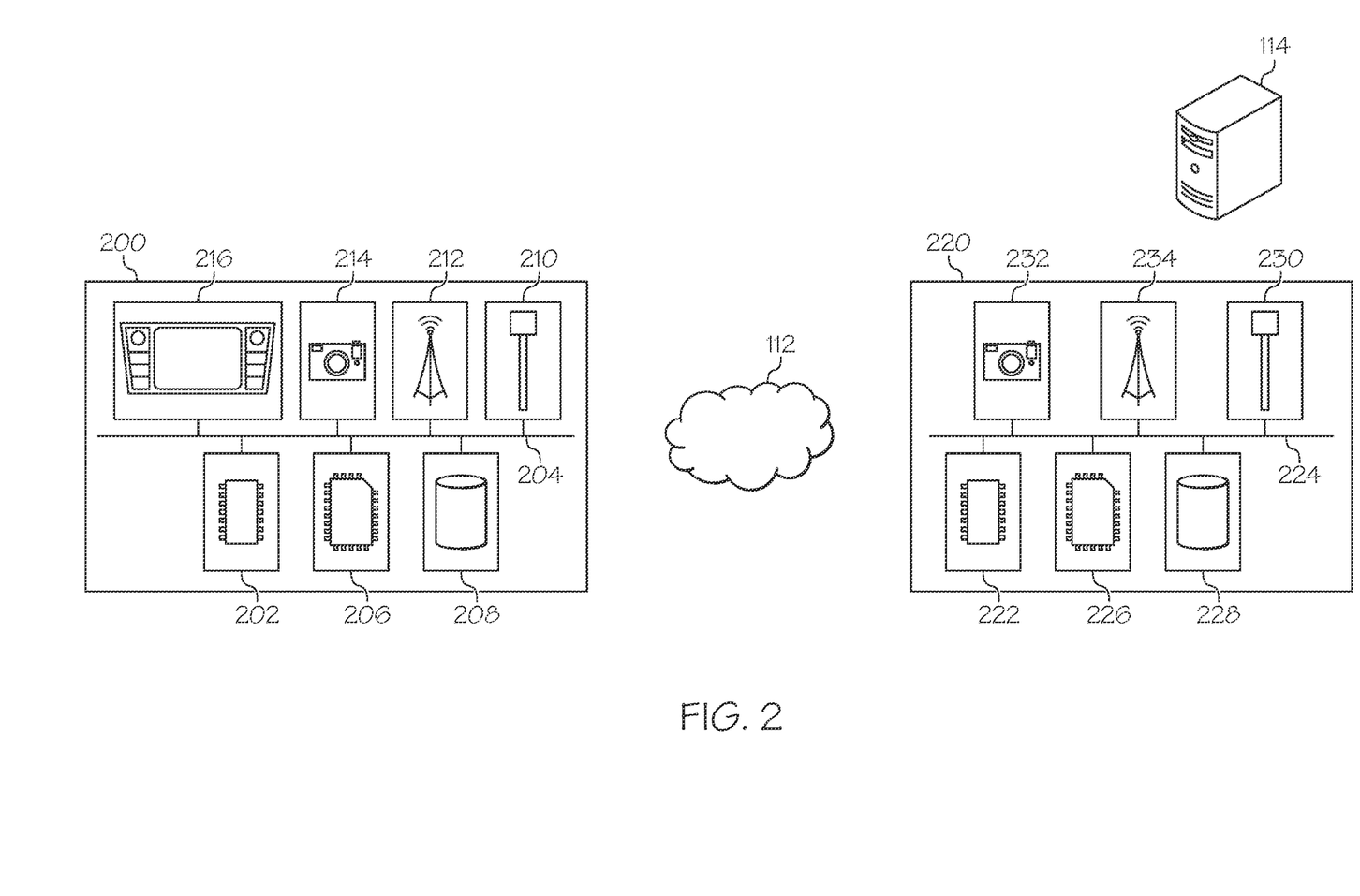
FIG. 2 schematically depicts non-limiting components of the vehicles and the devices of the present disclosure, according to one or more embodiments described and illustrated herein.

FIG. 2 schematically depicts non-limiting components of the vehicles and the devices of the present disclosure, according to one or more embodiments described and illustrated herein.

A mobile device system 200 and a vehicle system 220 include processors 202 and 222. The mobile device system 200 may be included within the devices 102, 106, and the vehicle system 220 may be included within the vehicles 116, 118. The processors 202, 222 may be any device capable of executing machine readable and executable instructions. Accordingly, the processors 202, 222 may be a controller, an integrated circuit, a microchip, a computer, or any other computing device. The processors 202, 222 may be coupled to communication paths 204, 224, respectively, that provide signal interconnectivity between various modules of the systems 200, 220. Accordingly, the communication paths 204, 224 may communicatively couple any number of processors (e.g., comparable to the processors 202, 222) with one another, and allow the modules coupled to the communication paths 204, 224 to operate in a distributed computing environment. Specifically, each of the modules may operate as a node that may send and/or receive data. As used herein, the term "communicatively coupled" means that the coupled components are capable of exchanging data signals with one another such as, for example, electrical signals via conductive medium, electromagnetic signals via air, optical signals via optical waveguides, and the like.

Accordingly, the communication paths 204, 224 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication paths 204, 224 may be formed from a combination of mediums capable of transmitting signals. In one embodiment, the communication paths 204, 224 comprises a combination of conductive traces, conductive wires, connectors, and buses that cooperate to permit the transmission of electrical data signals to components such as processors, memories, sensors, input devices, output devices, and communication devices. Accordingly, the communication paths 204, 224 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The mobile device system 200 and the vehicle system 220 also include one or more memory modules 206, 226 respectively, which are coupled to the communication paths 204, 224. The one or more memory modules 206, 226 may comprise RAM, ROM, flash memories, hard drives, or any device capable of storing machine readable and executable instructions such that the machine readable and executable instructions can be accessed by the processors 202, 222. The machine readable and executable instructions may comprise logic or algorithm(s) written in any programming language of any generation (e.g., 1GL, 2GL, 3GL, 4GL, or 5GL) such as, for example, machine language that may be directly executed by the processors 202, 222 or assembly language, object-oriented programming (OOP), scripting languages, microcode, etc., that may be compiled or assembled into machine readable and executable instructions and stored on the one or more memory modules 206, 226. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In some embodiments, the one or more memory modules 206, 226 may store data related to status and operating condition information related to one or more vehicle components, e.g., brakes, airbags, cruise control, electric power steering, battery condition, and so forth.

The mobile device system 200 and the vehicle system 220 may include one or more sensors 208, 228. Each of the one or more sensors 208, 228 is coupled to the communication paths 204, 224 and communicatively coupled to the processors 202, 222. The one or more sensors 208 may include one or more motion sensors for detecting and measuring motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the mobile device system 200 and the vehicle system 220 optionally includes satellite antennas 210, 230 coupled to the communication paths 204, 224 such that the communication paths 204, 224 communicatively couple the satellite antennas 210, 230 to other modules of the vehicle system 220. The satellite antennas 210, 230 are configured to receive signals from global positioning system satellites. Specifically, in one embodiment, the satellite antennas 210, 230 include one or more conductive elements that interact with electromagnetic signals transmitted by global positioning system satellites. The received signal is transformed into a data signal indicative of the location (e.g., latitude and longitude) of the satellite antennas 210, 230 or an object positioned near the satellite antennas 210, 230, by the processors 202, 222.

The mobile device system 200 and the vehicle system 220 may include network interface hardware 212, 234 for communicatively coupling the mobile device system 200 and the vehicle system 220 with the server 114, e.g., via communication network 112. The network interface hardware 212, 234 is coupled to the communication paths 204, 224 such that the communication path 204 communicatively couples the network interface hardware 212, 234 to other modules of the mobile device system 200 and the vehicle system 220. The network interface hardware 212, 234 may be any device capable of transmitting and/or receiving data via a wireless network, e.g., the communication network 112. Accordingly, the network interface hardware 212, 234 may include a communication transceiver for sending and/or receiving data according to any wireless communication standard. For example, the network interface hardware 212, 234 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 212, 234 includes a Bluetooth transceiver that enables the mobile device system 200 and the vehicle system 220 to exchange information with the server 114 via Bluetooth.

The network interface hardware 212, 234 may utilize various communication protocols to establish a connection between multiple mobile device and/or vehicles. For example, in embodiments, the network interface hardware 212, 234 may utilize a communication protocol that enables communication between a vehicle and various other devices, e.g., vehicle-to-everything (V2X). Additionally, in other embodiments, the network interface hardware 212, 234 may utilize a communication protocol that is dedicated for short range communications (DSRC). Compatibility with other comparable communication protocols are also contemplated.

It is noted that communication protocols include multiple layers as defined by the Open Systems Interconnection Model (OSI model), which defines a telecommunication protocol as having multiple layers, e.g., Application layer, Presentation layer, Session layer, Transport layer, Network layer, Data link layer, and Physical layer. To function correctly, each communication protocol includes a top layer protocol and one or more bottom layer protocols. Examples of top layer protocols (e.g., application layer protocols) include HTTP, HTTP2 (SPDY), and HTTP3 (QUIC), which are appropriate for transmitting and exchanging data in general formats. Application layer protocols such as RTP and RTCP may be appropriate for various real time communications such as, e.g., telephony and messaging. Additionally, SSH and SFTP may be appropriate for secure maintenance, MQTT and AMQP may be appropriate for status notification and wakeup trigger, and MPEG-DASH/HLS may be appropriate for live video streaming with user-end systems. Examples of transport layer protocols that are selected by the various application layer protocols listed above include, e.g., TCP, QUIC/SPDY, SCTP, DCCP, UDP, and RUDP.

The mobile device system 200 and the vehicle system 220 includes cameras 214, 232. The cameras 214, 232 may have any resolution. In some embodiments, one or more optical components, such as a mirror, fish-eye lens, or any other type of lens may be optically coupled to the cameras 214, 232. In embodiments, the camera may have a broad angle feature that enables capturing digital content within a 150 degree to 180 degree arc range. Alternatively, the cameras 214, 232 may have a narrow angle feature that enables capturing digital content within a narrow arc range, e.g., 60 degree to 90 degree arc range. In embodiments, the one or more cameras may be capable of capturing high definition images in a 720 pixel resolution, a 1080 pixel resolution, and so forth.

In embodiments, the mobile device system 200 may include a display 216 for providing visual output. The display 216 may output images and/or a live video stream of various types of data. The display 216 is coupled to the communication path 204. Accordingly, the communication path 204 communicatively couples the display 216 to other modules of the mobile device system 200 including, without limitation, the processor 202 and/or the one or more memory modules 206.

Figure 3:
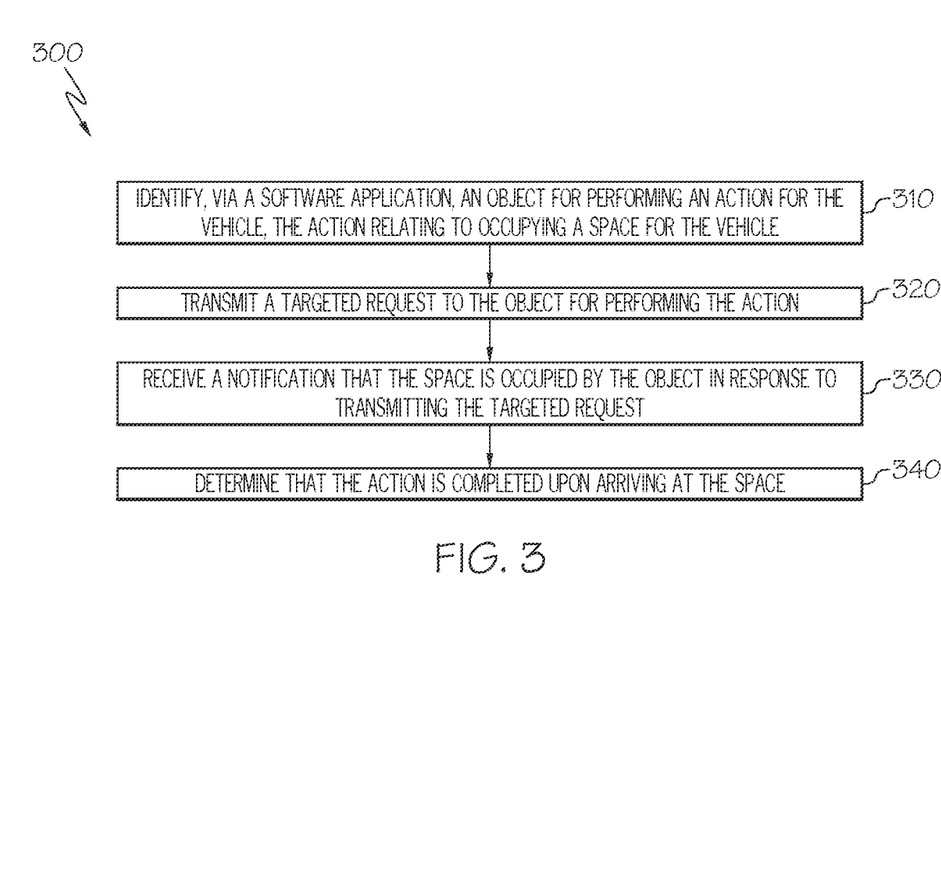
FIG. 3 depicts a flow chart that enumerates steps for enabling connections between one or more devices and/or users to facilitate occupation of geographic spaces, according to one or more embodiments described and illustrated herein.

FIG. 3 depicts a flow chart that enumerates steps for enabling connections between one or more devices and/or users to facilitate occupation of geographic spaces, according to one or more embodiments described and illustrated herein.

In embodiments, in block 310, the processor 202, which may be included within a device of a user, may identify, via a software application, an object (e.g., other users) for performing an action for the vehicle. The action may relate to occupying a space for the vehicle. In embodiments, the devices as described in the present disclosure may include a smartphone, laptop, and the like. Users may, using the device, download a software application (e.g., via an application store) and create respective user accounts, which may include various details regarding these users, e.g., name, location, preferences, and the like.

In embodiments, as stated above, users may access the software application via their respective user devices, e.g., by selecting an icon that is output on the displays of the user devices. Thereafter, in embodiments, a user may select a particular action that he or she would like to be performed (e.g., reserve a parking spot, transport his or her vehicle, determine hours of operation of a store, etc.) and broadcast message to a plurality of other users that have registered with the software application. In embodiments, a broadcast message may be communicated by the user, via a communication network 112, to the plurality of users via, e.g., TCP/IP, UDP, or another communication protocol. The broadcast message may describe the action that this user would like performed.

In some embodiments, the user that communicated the broadcast message may then receive a list of a plurality of other users that may be able to perform the action. For example, the list of users may include registered users within a certain proximity of the location where the action needs to be performed, registered users within a certain proximity of the user that sent the broadcast message, etc. In embodiments, the user that sent the broadcast message may identify and select a particular registered user (e.g., an object) to perform the action, e.g., reserve a parking spot, transport his or her vehicle, determine hours of operation of a store, etc. Identification may include the user selecting an icon adjacent to a registered user whose information is output on a display of the device of the user. It is noted that the object may also be a vehicle, device, and/or the like, and the communication may occur between two or more devices, automatically and without user intervention. Additionally, in embodiments, the identification and selection of registered users and/or registered devices may be performed by other devices, automatically and without user intervention.

In embodiments, in block 320, the user may transmit, via a device associated with the user, a targeted request to the object for performing the action. For example, a particular user may determine that a certain registered user is well suited to perform a particular action. In embodiments, if a user wants to reserve a parking spot in a parking lot adjacent his place of business, he may determine that a registered user that is located within a certain distance (e.g., within a few miles) of the place of business is well suited to perform the action, and as such, may transmit a targeted request to this user, via the communication network 112. In embodiments, the software application may, automatically and without user intervention, transmit a targeted request to a registered user that may suited to perform the action. In some embodiments, the identification and selection of the user, and a transmission of a targeted request to this user may be performed using a combination of one or more artificial intelligence and machine learning techniques. In embodiments, a particular registered user that receives the targeted request may accept the request to perform the action and communicate the acceptance in the form of a message transmitted via the communication network 112. The registered user may perform the action. For example, if the action relates to reserving a geographic space (e.g., a parking spot), the registered user may drive his vehicle to a parking lot, park his vehicle at the parking spot, and transmit a notification that the action has been completed in the form of a message from his device to the device of the requesting user via the communication network 112.

In some embodiments, the device 102 may, via the software application and automatically and without user intervention, transmit a targeted request to a user based on a status or designation of the user as saved in the software application, e.g., status or designation of a "preferred user". In some embodiments, a particular user may be determined by the processor 202 as a preferred user (e.g., status or designation) based on a score that is calculated in association with this user. In embodiments, the score may be calculated based on analyzing various factors such as, historical data relating to past interactions with the preferred user, positive and/or negative feedback associated with the preferred user (which may be stored and tracked by the software application as e.g., as satisfaction points), the distance between the preferred user and a location where an action is to be performed, consistency with which the preferred user has completed the actions, and so forth. It is noted that, in embodiments, a particular preferred user may be matched more frequently with a particular user based on the score associated with the preferred user.

In embodiments, in block 330, the action requesting user may receive a notification that the geographic space (e.g., a parking spot) is occupied by the object (e.g., another user) in response to transmitting the targeted request. For example, the notification may be output, in real time, on a display of a device associated with the requesting user. In embodiments, the notification may be manually initiated and transmitted by a registered user, or transmitted automatically and without user intervention by the user.

In embodiments, in block 340, the processor 202, which may be included within a device of the action requesting user, may determine that the action is completed upon the device arriving at the geographic space. For example, in embodiments, upon the device of the user being within a certain proximity of the parking spot, the processor 202 may determine, automatically and without user intervention, that the action is completed. For example, in embodiments, the device of a user may include a camera that captures one or more images of the geographic space upon arriving within a certain proximity of the geographic space. Thereafter, the processor 202 may analyze the captured one or more images and determine whether the action has been completed, e.g., a particular geographic space is occupied by the user to whom the targeted request was transmitted. In embodiments, the processor 202 may analyze the captured images, extract data related to a user (facial recognition) and the user's vehicle (e.g., license plate information), and confirm that the user to whom the targeted request was transmitted is the user that has occupied the geographic space. In this way, in embodiments, the captured images may be analyzed to determine a status of the geographic space.

Additionally, in other embodiments, an action requesting user may transmit a request to other users to determine status information associated with a location, e.g., a mall, a grocery store, a gas station, etc. In response, this user may receive, an update from a device of another user, which may capture one or more images of a location such as, e.g., a mall, a grocery store, a gas station, etc. In embodiments, these images may be analyzed to determine status information associated the location, such as the hours of operation, availability of parking spots in the parking lot, and so forth. Additionally, in embodiments, these images may be analyzed to determine a total number of people within the location, and generate an occupancy status associated with the location, e.g., "Crowded", "Not Crowded", and so forth. Such a status may be transmitted as a message to the action requesting user.

In embodiments, in response to completing the action, a payment processing operation may be performed, automatically and without user intervention, such that the payment may be made to the user that performed the action.

Figure 4A:
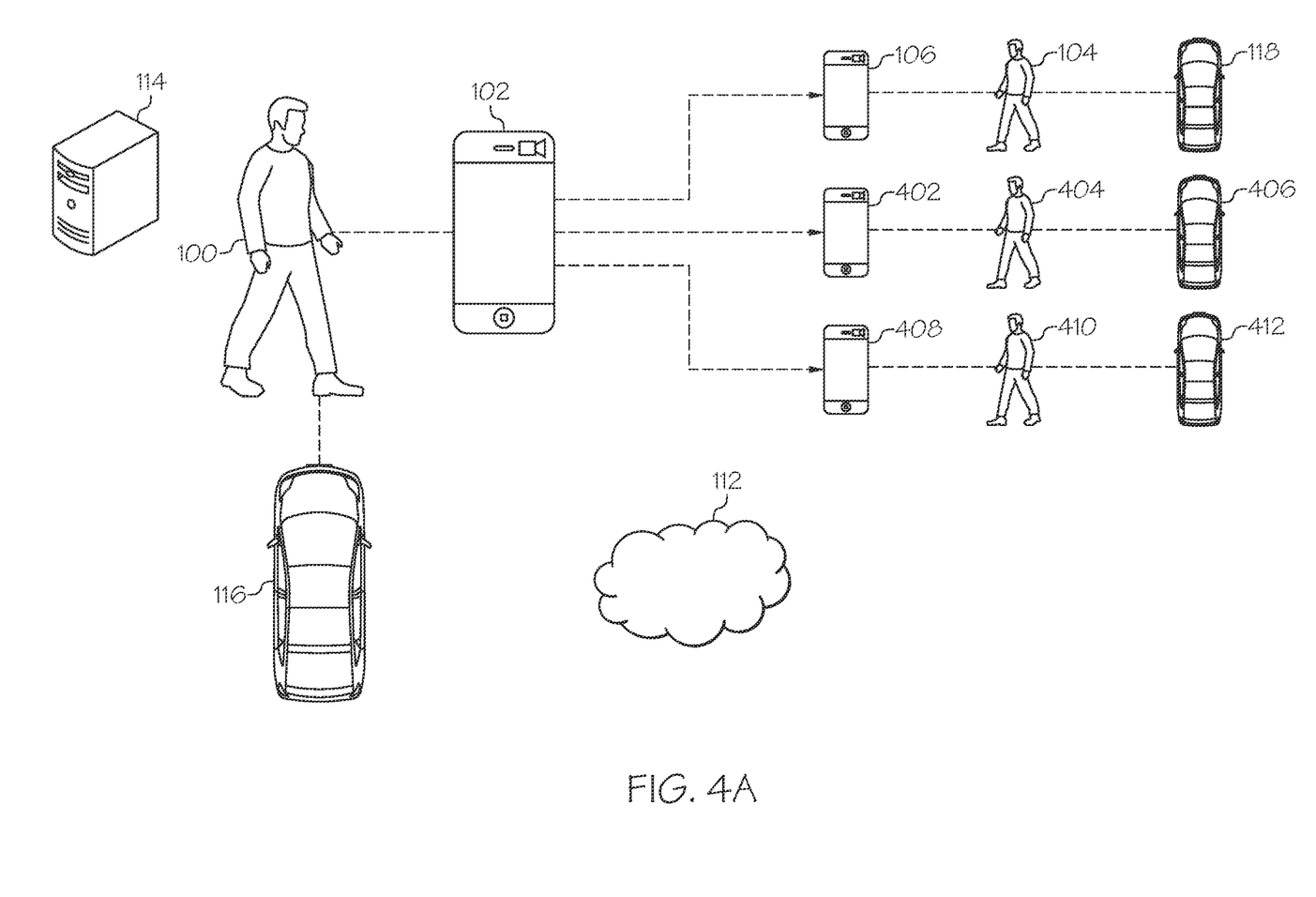
FIG. 4A schematically depicts an example operation in which a user initiates communications with a plurality of connected users for performing a particular action, according to one or more embodiments described and illustrated herein.

FIG. 4A schematically depicts an example operation in which a user initiates communications with a plurality of registered users for performing a particular action, according to one or more embodiments described and illustrated herein. Specifically, as illustrated in FIG. 4A, the user 100 may access a software application of the present disclosure from the device 102, which is associated with the user 100. Additionally, the user 100 may transmit a broadcast signal to a plurality of other users, e.g., users 104, 404, 410. Each of these users may be associated with devices 106, 402, 408. Moreover, the users 104, 404, 410 may also be associated with vehicles 118, 406, 412, respectively. As stated, the broadcast signal may be transmitted by the user 100, via the communication network 112, to each of the plurality of users using any of a variety of communication protocols, e.g., TCP/IP, UDP, etc. In some embodiments, it is noted that the broadcast signal may be transmitted automatically and without user intervention by the device 102, namely upon the user 100 selecting an action that he would like performed, e.g., reserve a parking spot.

Figure 4B:
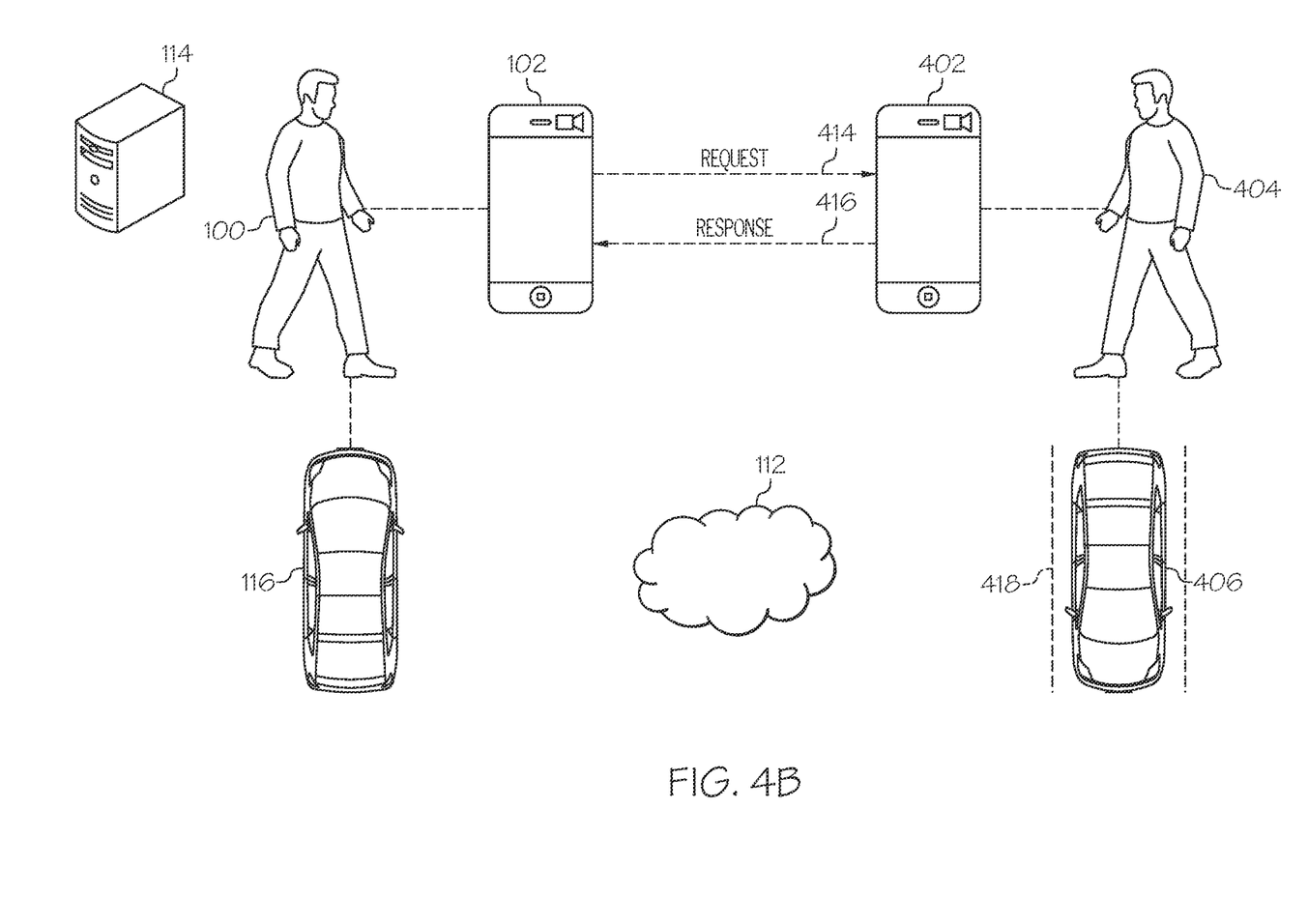
FIG. 4B depicts an example operation in which a user transmits a targeted request to another user, who performs an action and transmits a response notification to the user, according to one or more embodiments described and illustrated herein.

FIG. 4B depicts an example operation in which a user transmits a targeted request to another user, who performs an action and transmits a response notification to the user, according to one or more embodiments described and illustrated herein.

For example, as illustrated in FIG. 4B, the user 100 may transmit a targeted request 414 to the device 402 associated with the user 404, as the user 100 may determine that the user 404 is well suited to reserve a parking spot at a particular location. Specifically, in embodiments, the user 100 may determine the user 404 is closest in proximity to the parking lot, the user 404 is a preferred user for the user 100, and the like. A variety of other factors may be utilized to identify and select a particular user for performing the action. In some embodiments, the targeted request 414 may include various types of data, e.g., name of the action requesting party, the time frame in which the action is to be performed, the location at which the action is to be performed, and a payment amount associated with the action. In some embodiments, the user 404 may view and confirm that the conditions of the request are agreeable to the user 404, and transmit confirmation message from the device 402 to the device 102 via the communication network 112.

Thereafter, as illustrated in FIG. 4B, the user 404 may drive the vehicle 406 (e.g., an additional vehicle) associated with the user 404 to the parking spot 418 within a particular time frame, e.g., by 12:30 PM EST on Monday. Additionally, in embodiments, the user 404 may park the vehicle 406 at the parking spot for a predetermined time frame and transmit a notification (e.g., response 416) from the device 402 to the device 102 via the communication network 112. In some embodiments, upon the user 404 parking the vehicle 406, the device 402 may, automatically and without user intervention, transmit a message (e.g., the response 416) to the device 102. For example, the device 402 may access the software application, identify the location of the user 404 and the vehicle 406 (e.g., using GPS), and determine based on the location determination, that the action has been performed.

Figure 5A:
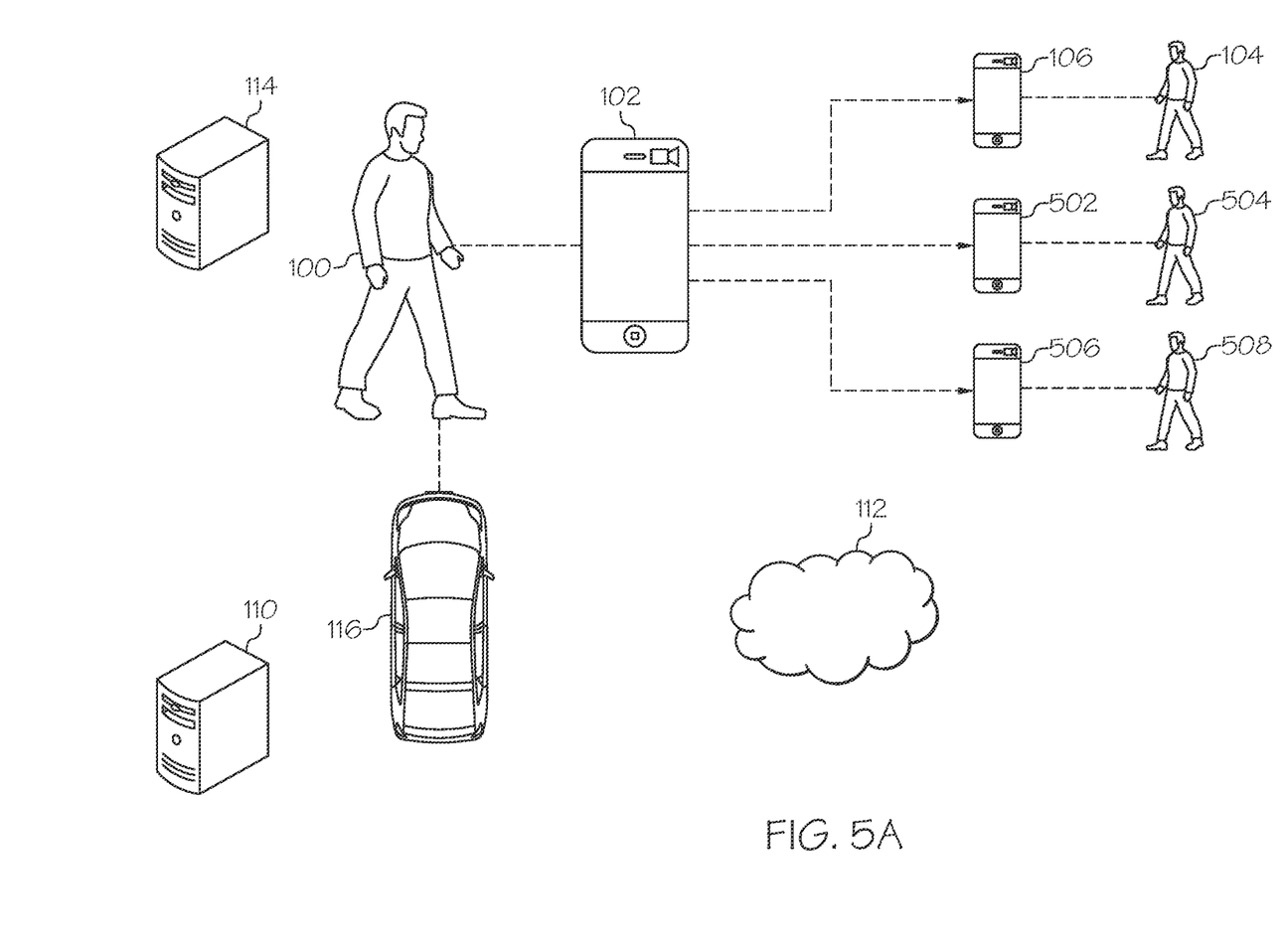
FIG. 5A schematically depicts an example operation in which a user initiates communications with a plurality of connected other users for performing another action, according to one or more embodiments described and illustrated herein.

FIG. 5A schematically depicts an example operation in which a user initiates communications with a plurality of registered or connected users for performing another action, according to one or more embodiments described and illustrated herein. Specifically, as illustrated in FIG. 5A, the user 100 may access a software application of the present disclosure from the device 102. Thereafter, the user 100 may transmit a broadcast signal to a plurality of other users, e.g., users 104, 504, 508. Each of these users may be associated with devices 106, 502, 506. A broadcast signal may be transmitted by the user 100, via the communication network 112, to each of the plurality of users 104, 504, 508 using any of a variety of communication protocols, e.g., TCP/IP, UDP, etc. In some embodiments, it is noted that the broadcast signal may be transmitted automatically and without user intervention by the device 102, namely upon the user 100 selecting an action that he would like performed, e.g., requesting a user for performing the action of transporting the vehicle 116 to a particular location.

Figure 5B:
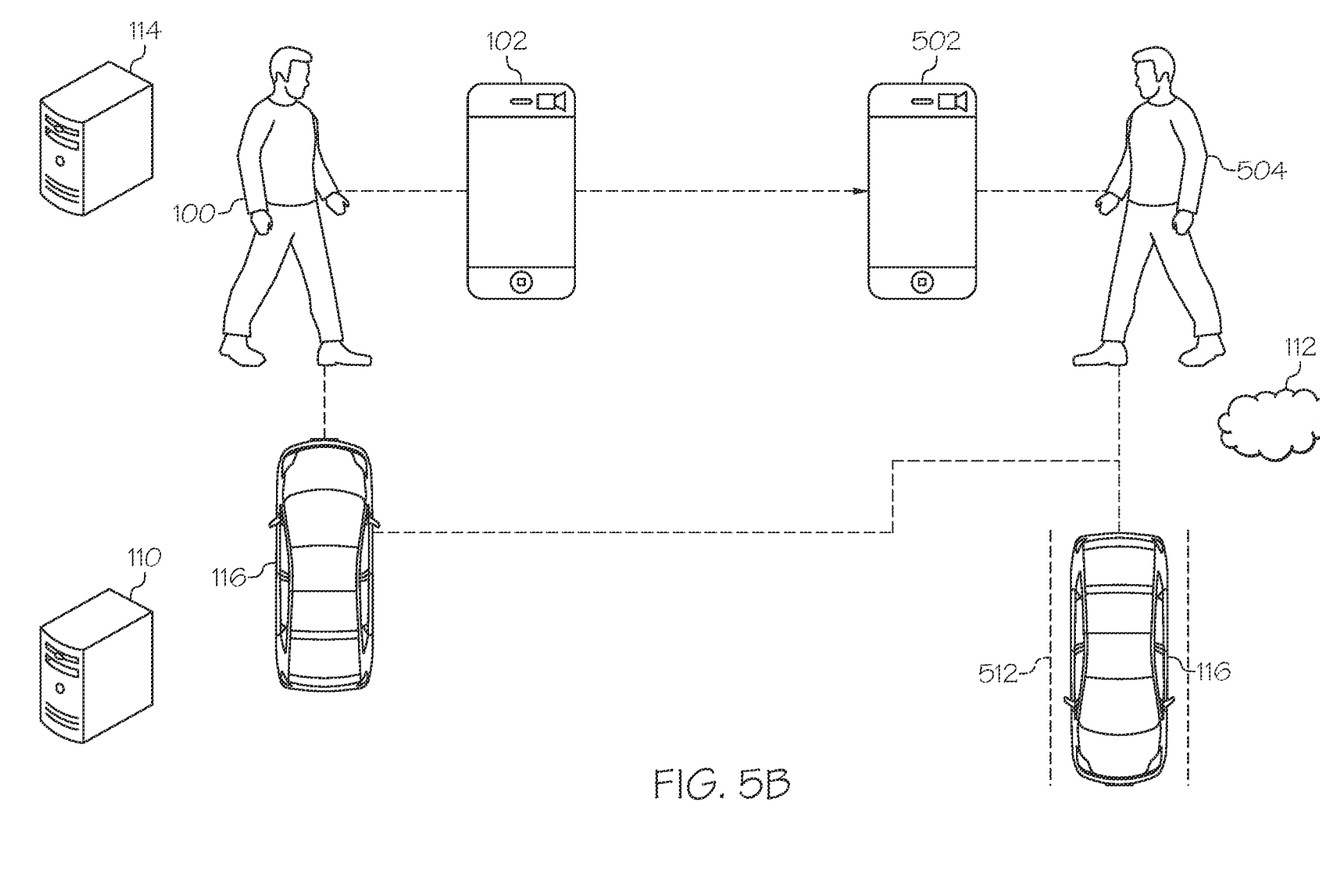
FIG. 5B depicts an example operation in which a user transmits another targeted request to another user, who performs an action and transmits a response notification to the user, according to one or more embodiments described and illustrated herein.

FIG. 5B depicts an example operation in which a user transmits another targeted request to another user, who performs an action and transmits a response notification to the user, according to one or more embodiments described and illustrated herein.

For example, as illustrated in FIG. 5B, the user 100 may transmit a targeted request to the device 502 associated with the user 504, as the user 100 may determine that the user 504 (e.g., an additional object) is well suited to transport the vehicle 116 to a particular location, e.g., from a location associated with the user 100 (e.g., a first location) to a different location (e.g. a second location). Specifically, in embodiments, the user 100 may determine that the user 504 is closest in proximity to where the user 100 is located, e.g., across the street from or a few blocks from the location of the user 100. In some embodiments, the targeted request (e.g., an additional targeted request) may include various types of data, e.g., name of the action (e.g., an additional action) requesting party, the time frame in which the action is to be performed, the location at which the action is to be performed, and a payment amount associated with the action. In some embodiments, the user 504 may view and confirm that the conditions of the request are agreeable to the user 504, and transmit a confirmation message from the device 502 to the device 102 via the communication network 112.

Thereafter, as illustrated in FIG. 5B, the user 504 may travel to where the user 100 is located and transport the vehicle 116 to a particular location (parking spot 512) within a certain amount of time. In some embodiments, upon the user 504 parking the vehicle 116, the device 502 may, automatically and without user intervention, transmit a message to the device 102 via the communication network 112. For example, the device 502 may access the software application, identify the location of the user 504 and the vehicle 116 (e.g., using GPS coordinates), and transmit a message to the device 102.

It should now be understood that the embodiments described herein relate to a method for controlling occupation of geographic spaces via a software application. The method includes identifying, via a software application, an object for performing an action for the vehicle, the action relating to occupying a space for the vehicle, transmitting a targeted request to the object for the performing the action, receiving a notification that the space is occupied by the object in response to the transmitting the targeted request, and determining that the action is completed upon arriving at the space.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A device comprising:
    a processor, operating in conjunction with a software application, configured to:
        identify, via the software application, an object for performing an action for a vehicle, the action relating to occupying a space for the vehicle;
        transmit a targeted request to the object for performing the action, wherein the targeted request is for the object to drive to a particular parking spot at a location that is specified in the targeted request, and the targeted request includes a time frame in which the object occupies the particular parking spot;
        receive a notification that the space is occupied by the object in response to transmitting the targeted request; and
        determine that the action is completed upon arriving at the space; and
        transmit another targeted request to a valet located near the vehicle to transport the vehicle to the particular parking spot, wherein the particular parking spot is occupied by the object for the vehicle.

2. The device of claim 1, wherein the processor is further configured to transmit an additional targeted request for performing an additional action to an additional object, the additional action relating to identifying data related to hours of operation associated with a location.

3. The device of claim 1, wherein the processor is configured to process a payment to the object in response to determining that the action is completed in real time.

4. The device of claim 1, wherein the notification that the space is occupied includes a message indicating that a parking spot is reserved for the vehicle by the object.

5. The device of claim 1, wherein the object is an additional vehicle that is different from the vehicle.

6. The device of claim 1, wherein the processor is further configured to identify, via the software application, an additional object for transporting the vehicle from a first location to a second location, the first location and the second location being locations different from the particular parking spot.

7. A method comprising:
    identifying, via a software application, an object for performing an action for a vehicle, the action relating to occupying a space for the vehicle;
    transmitting a targeted request to the object for performing the action, wherein the targeted request is for the object to drive to a particular parking spot at a location that is specified in the targeted request, and the targeted request includes a time frame in which the object occupies the particular parking spot;
    receiving a notification that the space is occupied by the object in response to transmitting the targeted request; and
    determining that the action is completed upon arriving at the space and
    transmitting another targeted request to a valet located near the vehicle to transport the vehicle to the particular parking spot, wherein the particular parking spot is occupied by the object for the vehicle.

8. The method of claim 7, further comprising transmitting an additional targeted request for performing an additional action to an additional object, the additional action relating to identifying data related to hours of operation associated with a location.

9. The method of claim 7, further comprising processing a payment to the object in response to determining that the action is completed in real time.

10. The method of claim 7, wherein the notification that the space is occupied includes a message indicating that a parking spot is reserved for the vehicle by the object.

11. The method of claim 7, wherein the object is an additional vehicle that is different from the vehicle.

12. The method of claim 7, further comprising identifying, via the software application, an additional object for transporting the vehicle from a first location to a second location.

13. The method of claim 7, further comprising:
    analyzing historical data relating to one or more interactions of the object;
    calculating, based on the analyzing, a score specific to the object; and
    determining a status of the object based on the score.

* * * * *

UNITED STATES PATENT AND TRADEMARK OFFICE
CERTIFICATE OF CORRECTION

| | |
|---|---|
| PATENT NO. | : 11,763,673 B2 |
| APPLICATION NO. | : 17/174885 |
| DATED | : September 19, 2023 |
| INVENTOR(S) | : Masashi Nakagawa |

It is certified that error appears in the above-identified patent and that said Letters Patent is hereby corrected as shown below:

In the Specification

In Column 7, Line(s) 57, delete "may suited" and insert --may be suited--, therefor.

In the Claims

In Column 11, Line(s) 53, Claim 1, delete "and".

In Column 12, Line(s) 31, Claim 7, delete "and".

In Column 12, Line(s) 33, Claim 7, after "space", insert --;--.

Signed and Sealed this
Nineteenth Day of December, 2023

Katherine Kelly Vidal
*Director of the United States Patent and Trademark Office*